United States Patent Office 2,739,069
Patented Mar. 20, 1956

2,739,069

CELLULOSE ACETATE FILM-FORMING COMPOSITION AND A FILM MADE THEREFROM

Charles R. Fordyce and Bruce E. Gramkee, Rochester, N. Y., assignors to Eastman Kodak Company, Rochester, N. Y., a corporation of New Jersey No Drawing. Application November 28, 1951,
Serial No. 258,750

13 Claims. (Cl. 106—189)

This invention relates to solutions of high acetyl cellulose acetate (42.5 to 44.0% acetyl content) and to films made from such solutions. More particularly, the solutions with which the invention is concerned are comprised of high acetyl cellulose acetate in a solvent mixture made up of methylene chloride, butyl alcohol and methyl alcohol.

The solutions of the invention are particularly useful in the manufacture of motion-picture film having physical properties required in commercial use, such as high strength, moisture resistance, and resistance to rupture by folding or tearing. Particularly important in the qualities we have achieved in these films is the ability to resist blistering and change of focus when projected under extremely high intensity illumination. Such film is particularly useful for commercial motion-picture film support where the extremely high intensity illumination used, for example, in outdoor movies, has detrimentally affected film made according to the prior art. Where films other than for motion picture use must withstand similar high temperature conditions, they are advantageously made from the solutions taught herein.

The applicants have been issued U. S. Patents 2,492,977, 2,492,978 and 2,607,704. These three patents contain extensive background information relating to the manufacture of motion-picture film support, and the problems confronting workers in this art, and it therefore appears sufficient in the present application to discuss this background material only in a general manner, and as it particularly applies to the problems which have been overcome by the solutions, methods and films which are the subject matter of the present application.

In the motion-picture film support art, cellulose nitrate film support was used for a long period of time, and it possessed many highly desirable properties required in commercial motion-picture film, such as high tensile strength, flexibility, moisture resistance and rigidity. This material required handling with extreme care, however, because of its high inflammability, and it has been long recognized that it would be desirable to have a material for commercial motion-picture film base which would have the desirable characteristics of cellulose nitrate without its undesirable high inflammability. Many workers have grappled with this problem, and there are a number of prior art patents concerned with it. Nevertheless, insofar as we are aware, no products other than those described in our aforementioned patents and application, and in the present application, have been able to meet the requirements to which we have referred above and to provide a successful motion-picture film support or base for the commercial field.

Mention should perhaps be made of the fact that safety film of low inflammability has been manufactured for home use and other amateur purposes. Such film, often referred to as amateur film, is suitable for use in the amateur (8 and 16 mm.) fields where relatively mild projection and handling conditions are met, but it does not possess the properties necessary for resisting the drastic conditions which are encountered in the commercial motion-picture field. That is, such amateur safety film, when compared with nitrate film does not possess sufficiently high tensile strength, resistance to moisture, etc. In further detail, for example, whereas the range of swell and shrink for commercial nitrate film might be of from .5% to .8%, amateur safety film may show swell and shrink characteristics of from 1.0 to 1.75%.

Films formed from solutions described in our patents and application referred to above provide many of the desirable characteristics of cellulose nitrate film, and are also relatively noninflammable. Films made from the solutions of the present inventon provide certain advantages to a higher degree than such films, however, and particularly in the ability of the films to resist blistering and change of focus when subjected to extremely high intensity illumination, such as takes place, for example, during projection in outdoor "drive-in" movies. The solutions of the present invention have the necessary clarity and at the same time have the desirable characteristic of high casting speed in providing film supports having the desirable properties to which reference has been made above.

We have found in accordance with the present invention, that a solution of high acetyl cellulose acetate (42.5 to 44.0% acetyl content) may be prepared by dissolving about 14–19% (based on the weight of the entire casting composition) of such cellulose acetate in a solvent mixture having approximately the following composition percentage by weight:

| | Percent |
|---|---|
| Methylene chloride | 83–93 |
| Methyl alcohol | 2– 5 |
| n-Butyl alcohol | 5–12 | and that such solutions can be used for the production, at high coating speeds, of commercial motion-picture film base that possesses desirable properties comparable to cellulose nitrate film base, and at the same time has relatively low inflammability. Of great importance is the fact that such film also presents the difficultly obtainable, but highly desirable characteristics of having extremely high resistance to blistering and change of focus when subjected to extremely high intensity illumination as during projection.

High acetyl (42.5–44.0% acetyl content) cellulose acetate is difficultly soluble, particularly when it is desired to cast a film support of commercial utility from a solution of this ester. Faced with this difficulty and the fact that the prior art knowledge pertaining to solutions of lower acetyl content cellulose acetate is of little value when dealing with high acetyl contents, it was quite unexpected that the particular solvent mixture described herein should provide solutions from which could be cast in an economical manner the desired type of film. These solvent mixtures are quite critical and they succeed where quite similar solutions falling outside the ranges specified by applicants, or even using adjacent homologs of the components of the new solvent mixture, are not useable.

This invention has as one object the provision of a solution of high acetyl cellulose acetate (42.5 to 44.0% acetyl content) from which can be cast, at high casting speeds, sheets, films and the like, and particularly commercial motion-picture film support providing physical characteristics comparable with commercial cellulose nitrate film base, yet, are relatively noninflammable, and particularly important, able to resist blistering and change of focus when subjected to extremely high intensity illumination.

Another object of the invention is to provide films, sheets and the like, and particularly commercial motion-picture film support having the highly desirable characteristics to which reference has just been made.

Still another object of the invention is to provide a method of manufacturing the highly desirable type of film which has just been discussed.

These and other objects of the invention will be readily apparent from a consideration of the following description of the invention.

According to our invention, about 14–19% (based on the weight of the entire casting composition) of cellulose acetate of 42.5 to 44% acetyl content is dissolved in a three component solvent mixture comprising methylene chloride, butyl alcohol and methyl alcohol, the quantity of methylene chloride varying from 83 to 93% by weight of the solvent mixture, the butyl alcohol from 5 to 12%, and the methyl alcohol from 2 to 5%.

Of considerable importance is the fact that the solutions of the present invention are prepared without any elaborate and time consuming procedures and at room temperature.

The following examples illustrate the use of these compositions. In these examples, the percentages are by weight.

Example I

| | Percent |
|---|---|
| Methylene chloride | 88 |
| Methyl alcohol | 2 |
| Butyl alcohol | 10 |

A uniform solution of 100 parts (about 15.2% based on the weight of the entire casting composition) of cellulose acetate of 43.8% acetyl content in 478 parts of methylene chloride, 11 parts of methyl alcohol and 54 parts of butyl alcohol was prepared at room temperature. After the cellulose ester was completely dissolved, there was added 15 parts of triphenyl phosphate as plasticizer.

The resulting solution was filtered and converted into transparent photographic base in a film casting machine in the usual manner, the casting surface having a temperature of about 80° F. The resulting film was removed from the casting surface 3.6 minutes after it was applied to the casting surface. At that time, it was .0095" to .010" thick.

After a thorough curing to remove volatile solvents, the film was found to have the following physical properties:

| | Length | Width |
|---|---|---|
| Swell and Shrink, Percent | .60 | .98 |
| Tensile Strength, lbs./sq. in | 15,700 | 12,200 |
| Folds | 12 | 18 |
| Tear, grams | 45 | 57 |
| Residual solvent content, percent | 2.0 | |

Example II

| | Percent |
|---|---|
| Methylene chloride | 85 |
| Methyl alcohol | 5 |
| Butyl alcohol | 10 |

A uniform solution of 100 parts (about 15.1% based on the weight of the entire casting composition) of cellulose acetate of 43.8% acetyl content in 464 parts of methylene chloride, 28 parts of methyl alcohol and 55 parts of butyl alcohol was prepared at room temperature. After the cellulose ester was completely dissolved, there was added 15 parts of triphenyl phosphate as plasticizer.

The resulting solution was filtered and converted into transparent photographic base on a film casting machine in the usual manner. The resulting film was removed from the casting surface 3.2 minutes after it was applied to the casting surface, the casting surface having a temperature of about 80° F. At that time, it was 0.011" thick.

After a thorough curing to remove volatile solvents, the film was found to have the following physical properties:

| | Length | Width |
|---|---|---|
| Swell and Shrink, Percent | .50 | .88 |
| Tensile Strength, lbs./sq. in | 16,800 | 12,800 |
| Folds | 16 | 24 |
| Tear, grams | 36 | 43 |
| Residual solvent content, percent | 0.8 | |

Example III

| | Percent |
|---|---|
| Methylene chloride | 85 |
| Methyl alcohol | 3 |
| Butyl alcohol | 12 |

This composition comprises 100 parts (about 14.1% based on the weight of the entire casting composition) of cellulose acetate of 43.5% acetyl content dissolved in a mixture of 498 parts of methylene chloride, 12 parts of methyl alcohol and 76 parts of butyl alcohol, to which have been added 15 parts of triphenyl phosphate. When cast on a coating surface (surface temperature about 80° F.) and stripped 3.4 minutes later and cured in the air, it yielded a film support which had the following physical properties:

| | Length | Width |
|---|---|---|
| Swell and Shrink | .57 | .94 |
| Tensile strength, lbs./sq. in | 16,200 | 12,300 |
| Folds | 16 | 16 |
| Tear | 48 | 59 |
| Percent Residual Solvent Content | 2.0 | |

Example IV

| | Percent |
|---|---|
| Methylene chloride | 87 |
| Methyl alcohol | 3 |
| Butyl alcohol | 10 |

This composition comprises 100 parts (about 15.6% based on the weight of the entire casting composition) of cellulose acetate of 43.5% acetyl content dissolved in a mixture of 458 parts of methylene chloride, 16 parts of methyl alcohol and 53 parts of butyl alcohol to which was added 15 parts of triphenyl phosphate. When cast on a coating surface (surface temperature about 80° F.) and stripped 2.7 minutes later, there resulted a film support which had the following physical properties:

| | Length | Width |
|---|---|---|
| Swell and Shrink | .65 | .91 |
| Tensile strength, lbs./sq. in | 16,800 | 14,400 |
| Folds | 18 | 18 |
| Tear | 43 | 51 |
| Residual solvent content, percent | 1.9 | |

Example V

Higher concentrations of cellulose acetate in the solvent mixtures of the invention can be made if desired. As an example, 100 parts of cellulose ester of 43.5% acetyl content was dissolved in a mixture of 478 parts of methylene chloride, 11 parts of methyl alcohol and 54 parts of butyl alcohol to which was added 15 parts of triphenyl phosphate. This mixture contained 15.2% of cellulose ester. The dope mixture was concentrated in suitable equipment, as for example in that described in Patent 2,541,012, after which there was a concentration of cellulose ester of 18.0%. This dope mixture when cast on a coating surface having a temperature of about 70° F., stripped after 2.4 minutes, and cured in a current of warm air, yielded a support which had the following physical properties:

|  | Length | Width |
|---|---|---|
| Swell and Shrink | .58 | .98 |
| Tensile Strength | 16,800 | 12,800 |
| Percent Elongation | 16 | 36 |
| Folds | 13 | 14 |
| Tear | 44 | 56 |
| Percent Residual Solvent Content | 1.5 | |

*Example VI*

|  | Percent |
|---|---|
| Methylene chloride | 92 |
| Methyl alcohol | 3 |
| Butyl alcohol | 5 |

A uniform solution was made up at room temperature from 100 parts (about 15.2% based on the weight of the entire casting composition) of cellulose acetate of 43.5% acetyl content, 499 parts of methylene chloride, 16 parts of methyl alcohol, 27 parts of butyl alcohol and 15 parts of triphenyl phosphate. The solution was concentrated in a suitable manner, as in accordance with the teachings of Patent 2,541,012, to a total solids concentration of 21.9% and a cellulose acetate concentration of 19%.

This solution, when cast in the manner of Example IV on a coating surface having a temperature of about 80° F., stripped after 2.4 minutes, and cured in warm air, gave a product having physical properties of the order of the product of Example IV.

In casting films from solutions containing the higher percentages of cellulose acetate, the casting time is shorter and the solvent recovery load on the equipment diminished. In making up these higher cellulose acetate concentration solutions (such as that of Example VI) it is preferable, for obtaining a more grain-free solution, to dissolve the cellulose acetate in a methylene chloride-methyl alcohol mixture, and then to add the butyl alcohol containing the triphenyl phosphate, followed by mixing until the composition is uniform. The solutions can then be concentrated and afterwards cast.

Casting surface temperatures of 60°–95° F. comprise the practical operating range in casting films from the solutions taught herein to produce the desired sheets or films.

The manner of determining the physical properties referred to in the preceding examples is well known, and is set forth in detail in our issued Patents 2,492,977 and 2,492,978.

Various types of dyes or other coloring agents either singly or in combination may be incorporated in films formed in accordance with the present invention. These agents may be fluorescent and may include, among others, the following: Eastone Red R, Eastone Red B, Nigrosine C. I. 864, Grasol Fast Black G, a coumarin dye such as 7-diethylamino-4-methylcoumarin, Sudan Black G., anthracene, Interchemical Acetate Scarlet B, rhodamine, flourene, chrysene, naphthacene, 2,2'-dihydroxybenzalazine, methyl umbelliphorone, anthranilic acid, ethyl anthranilate, 3 - dimethylamino - acriline, 2-phenyl-5-amino benzoxazole, and others.

These agents may be aded to the solution of cellulose acetate and the composition agitated until homogeneity is accomplished. Where the dyes are solids, they can be added to the cellulose acetate solution as such or in solution in the solvent mixture used for dissolving the cellulose acetate. They may also be added as a coating on the film, as by immersing the cellulose acetate film in a solution of the coloring agent in a solvent having no dissolving power for the cellulose acetate. In another manner of applying these agents, they may be mixed with the plasticizer before it is added to the dissolved cellulose ester.

In the above description triphenyl phosphate has been referred to as the plasticizer. This type of plasticizer is preferred because of its noninflammable nature. However, other plasticizers suitable for film use such as tricresyl phosphate, diethyl phthalate, dibutyl phthalate and tripropionin may be used in place of, or in conjunction with the triphenyl phosphate.

With regard to the amount of plasticizer used, we have found that best results are obtained where the amount of plasticizer is from 10 to 20% by weight of the amount of cellulose acetate used.

As explained above, films cast from the solutions disclosed herein answer long existing needs of the commercial motion-picture film industry for a film base which will resist blistering and change of focus during projection under extremely high light intensities. This property is of great importance where the film is to be used in such places as outdoor movies, sometimes referred to as "drive-in" movies, where extremely large screens are used. This is a great step forward in the art, and it provides an answer to a problem which has perplexed numerous workers in the art.

While we do not desire to be bound by any theory as to the reason why film manufactured in accordance with our invention exhibits such outstanding blister resistance as well as other desirable difficultly obtainable physical characteristics, it appears that blistering in previous film supports during high intensity illumination was caused by the action of the accompanying intense heat on residual solvents therein, and that the low residual solvent content of film support manufactured according to our invention is important in obtaining the high resistance to blistering which characterized our film. It would appear that the particular critical range of solvent mixtures set forth herein gives this unexpected blistering resistance because it permits reduction of the residual solvent content of the film by well known curing procedure to such an unusually low figure, while still maintaining the dimensional stability, strength and resistance to folding and tearing in the high range required for commercial motion-picture film support.

We claim:

1. As a new composition of matter, a cellulose acetate film forming composition capable of being rapidly formed into sheets, films and the like, and particularly useful in the manufacture of highly stable commercial motion-picture film base having high resistance to blistering and changes in focus when subjected to high intensity illumination, as during projection, comprising cellulose acetate having an acetyl content of 42.5–44.0% in solution in a solvent mixture composed of the following components present in approximately the following percentages by weight based on the weight of the solvent mixture:

|  | Per cent |
|---|---|
| Methylene chloride | 83–93 |
| Methyl alcohol | 2– 5 |
| Butyl alcohol | 5–12 |

2. A new composition of matter according to claim 1, wherein the solvent mixture has approximately the following composition:

|  | Per cent |
|---|---|
| Methylene chloride | 88 |
| Methyl alcohol | 2 |
| Butyl alcohol | 10 |

3. A new composition of matter according to claim 1, wherein the solvent mixture has approximately the following composition:

|  | Per cent |
|---|---|
| Methylene chloride | 85 |
| Methyl alcohol | 5 |
| Butyl alcohol | 10 |

4. A new composition of matter according to claim 1, wherein the solvent mixture has approximately the following composition:

| | Per cent |
|---|---|
| Methylene chloride | 85 |
| Methyl alcohol | 3 |
| Butyl alcohol | 12 |

5. A new composition of matter according to claim 1, wherein the solvent mixture has approximately the following composition:

| | Per cent |
|---|---|
| Methylene chloride | 87 |
| Methyl alcohol | 3 |
| Butyl alcohol | 10 |

6. A new composition of matter according to claim 1, wherein the solvent mixture has approximately the following composition:

| | Per cent |
|---|---|
| Methylene chloride | 92 |
| Methyl alcohol | 3 |
| Butyl alcohol | 5 |

7. A cellulose acetate film made by casting a plasticized solution of about 14–19% (based on the weight of the entire casting composition) high acetyl cellulose acetate (42.5–44.0% acetyl content) in a solvent mixture having the following approximate composition:

| | Per cent |
|---|---|
| Methylene chloride | 83–93 |
| Methyl alcohol | 2–5 |
| Butyl alcohol | 5–12 |

8. Cellulose acetate film as set forth in claim 7, wherein the residual solvent content of the film is not greater than about 2.0%.

9. A cellulose acetate film made by casting a plasticized solution of about 14–19% (based on the weight of the entire casting composition) high acetyl cellulose acetate (42.5–44.0% acetyl content) in a solvent mixture having the following approximate composition:

| | Per cent |
|---|---|
| Methylene chloride | 88 |
| Methyl alcohol | 2 |
| Butyl alcohol | 10 |

10. A cellulose acetate film made by casting a plasticized solution of about 14–19% (based on the weight of the entire casting composition) high acetyl cellulose acetate (42.5–44.0% acetyl content) in a solvent mixture having the following approximate composition:

| | Per cent |
|---|---|
| Methylene chloride | 85 |
| Methyl alcohol | 5 |
| Butyl alcohol | 10 |

11. A cellulose acetate film made by casting a plasticized solution of about 14–19% (based on the weight of the entire casting composition) high acetyl cellulose acetate (42.5–44.0% acetyl content) in a solvent mixture having the following approximate composition:

| | Per cent |
|---|---|
| Methylene chloride | 85 |
| Methyl alcohol | 3 |
| Butyl alcohol | 12 |

12. A cellulose acetate film made by casting a plasticized solution of about 14–19% (based on the weight of the entire casting composition) high acetyl cellulose acetate (42.5–44.0% acetyl content) in a solvent mixture having the following approximate composition:

| | Per cent |
|---|---|
| Methylene chloride | 87 |
| Methyl alcohol | 3 |
| Butyl alcohol | 10 |

13. A cellulose acetate film made by casting a plasticized solution of about 14–19% (based on the weight of the entire casting composition) high acetyl cellulose acetate (42.5–44.0% acetyl content) in a solvent mixture having the following approximate composition:

| | Per cent |
|---|---|
| Methylene chloride | 92 |
| Methyl alcohol | 3 |
| Butyl alcohol | 5 |

References Cited in the file of this patent

UNITED STATES PATENTS

| 1,384,188 | Goerner | July 12, 1921 |
| 1,844,365 | Moss | Feb. 9, 1932 |
| 2,003,655 | Reid | June 4, 1935 |
| 2,447,459 | Famulener | Aug. 17, 1948 |

FOREIGN PATENTS

| 235,774 | Switzerland | May 16, 1945 |